UNITED STATES PATENT OFFICE.

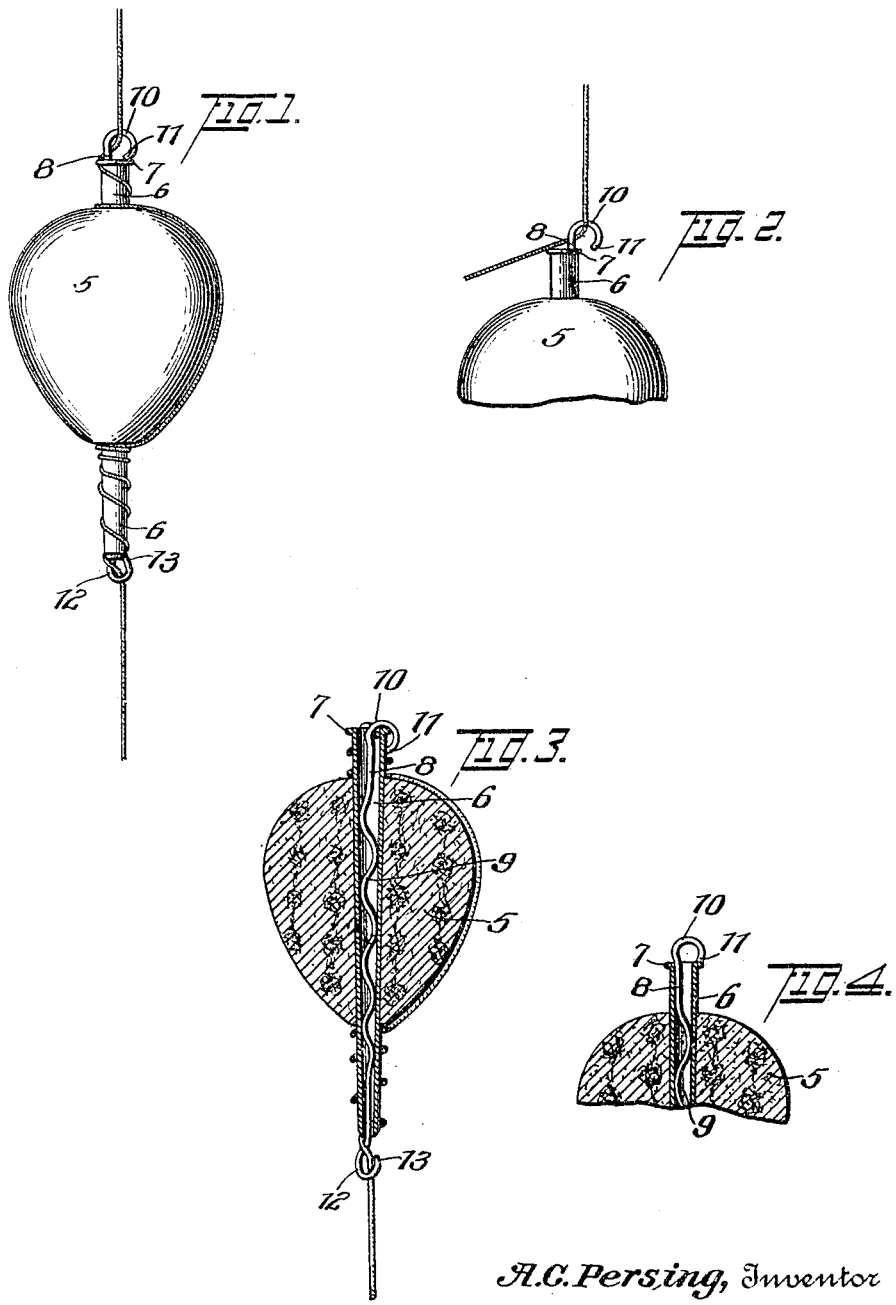

ABRAM C. PERSING, OF WILLARD, MISSOURI.

FISHING BOB OR FLOAT.

No. 798,620.　　　　Specification of Letters Patent.　　　　Patented Sept. 5, 1905.

Application filed April 7, 1905. Serial No. 254,285.

*To all whom it may concern:*

Be it known that I, ABRAM C. PERSING, a citizen of the United States, residing at Willard, in the county of Greene and State of Missouri, have invented a new and useful Fishing Bob or Float, of which the following is a specification.

This invention relates to improvements in devices by means of which a fish-hook can be suspended at any depth desired from the surface of the water.

The principal object is to provide a novel yet simple bob or float which can be readily applied to a line at any place desired without the necessity of threading such line at one end through the same, the device being as readily detachable and yet when in place being entirely secure and not liable to accidental displacement or derangement. The float is thus particularly adaptable for attachment to a line after the same has been fitted up with hook and sinker and does not involve the necessity and delay of first removing the same from the line.

The preferred but not the only embodiment of the invention is illustrated in the accompanying drawings, wherein—

Figure 1 is a side elevation of the improved bob or float. Fig. 2 is a similar view of the upper portion of the same, showing the upper eye open to permit the passage of the line. Fig. 3 is a longitudinal sectional view through the bob or float and showing the lower eye opened to permit the passage of a line. Fig. 4 is a detail sectional view through the upper portion of the float, showing the upper eye closed.

Similar reference-numerals designate corresponding parts in all the figures of the drawings.

In the embodiment illustrated a float-body 5 is employed that may be of any desired material and shape. Through this float-body extends a tubular and preferably, though not necessarily, tapering holder 6, formed of sheet metal and having an annular rim 7 at its upper end. The float-body and holder are relatively immovable. Extending through the tubular holder is a shank 8, of wire or other suitable resilient material, the main portion of said shank being provided with serpentine curves 9, so that it will frictionally engage the inner walls of the holder. The said shank is longitudinally slidable in the holder, and its upper end is furthermore laterally movable therein. Said upper end is formed into a hook 10, the free terminal 11 of which is normally in engagement with the top edge of the holder 6, as illustrated in Figs. 1 and 4, being held in this position by the resilient action of the shank. The hook 10 constitutes a line-receiving eye having a mouth to permit the passage of the line, which mouth is normally closed, as shown in Figs. 1 and 4, and is adapted to be opened by pressing the shank laterally in one direction to carry the terminal 11 away from and outside the upper edge of the holder 6, as illustrated in Fig. 2. The lower end of the shank 8 is also provided with a hook, which is designated 12, said hook having its free terminal 13 normally in engagement with the lower end of the tubular holder 6, said hook thus forming an eye that receives the line, which eye is provided with a mouth normally closed, but open to permit the passage of the line when the shank is moved longitudinally downward in the holder, as illustrated in Fig. 3.

In applying the bob or float to a line the upper hook may first be pressed laterally to open the mouth of the eye, whereupon the line can be engaged in said eye, as shown in Fig. 2. While still in this position the upper hook is pressed downwardly, so that its terminal 11 will engage over the outer wall of the upper end of the holder, this downward movement thus carrying the lower eye or hook away from the lower end of the holder. The line can then be wrapped several times around the holder above and below the float-body and engaged in the lower hook, as illustrated in Fig. 3. The lower hook is then pressed upwardly, whereupon said mouth is closed by the lower end of the holder, and as soon as the free terminal of the upper hook is disengaged from the upper end of the holder said hook will spring back to its original position, leaving the parts as illustrated in Fig. 1. It will be evident that when so arranged the upper hook constitutes a lock for preventing the longitudinal downward movement of the shank and the consequent opening of the lower eye or hook, and not only does the spring action of the upper end of the shank serve to hold the upper eye closed, but the strain upon the eye is such that it will not tend to draw the hook laterally. Thus it will be seen that a simple float is provided which can be readily applied to a line at any desired place after said line has been fitted up with hook and sinker. In like manner it may be readily detached; yet while in position it is not liable to accidental displacement.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a fishing-bob, the combination with a float-body, of a laterally-movable shank carried by the body and having an eye, said eye being provided with a line-receiving mouth that is normally closed and is opened upon the lateral movement of the shank in one direction to permit the passage of a line therethrough.

2. In a fishing-bob, the combination with a float-body, of a tubular holder located therein, a laterally-movable shank mounted in the holder and having a terminal eye, said eye being provided with a line-receiving mouth that is normally closed by the tubular holder and is opened upon the lateral movement of the shank in one direction in said holder to permit the passage of a line.

3. In a fishing-bob, the combination with a float-body, of a tubular holder located therein, a laterally-movable spring-shank mounted in the holder and having a hooked end projecting therefrom forming an eye, the free terminal of said hooked end being normally held by the shank against the holder and being movable away from the same upon the lateral movement of the shank to permit the passage of a line into and out of the eye.

4. In a fishing-bob, the combination with a float-body, of a shank carried thereby and having a longitudinal movement with respect thereto, and an eye carried by the shank and having a mouth that is unobstructed upon the longitudinal movement of the shank in one direction to permit the passage of a line into or out of the eye.

5. In a fishing-bob, the combination with a float-body, of a tubular holder carried thereby, a shank slidably mounted in the holder and having a hook forming an eye, said hook having its free terminal movable toward and from the holder on the longitudinal movement of the shank to open and close said hook.

6. In a fishing-bob, the combination with a float-body, of a shank carried thereby and having a longitudinal movement with respect thereto, an eye carried by the shank and having a mouth that is unobstructed upon the longitudinal movement of the shank in one direction to permit the passage of a line into or out of the eye, and means for locking the shank against its longitudinal movement.

7. In a fishing-bob, the combination with a float-body, of a tubular holder carried thereby, a shank slidably mounted in the holder and having a frictional engagement therewith, and a hook carried by the shank and forming a line-receiving eye, said hook having its free terminal movable into and out of engagement with the tubular holder to respectively prohibit and permit the passage of a line past said terminal.

8. In a fishing-bob, the combination with a float-body, of a tubular holder located therein, and a curved shank movably located in the holder in engagement therewith and having a terminal line-receiving eye.

9. In a fishing-bob, the combination with a float-body, of a tubular holder extending therethrough and projecting beyond the opposite ends of the body, a shank movably extending through the holder and having movable terminal and integral line-engaging eyes.

10. In a fishing-bob, the combination with a float-body, of a longitudinally-movable shank passing through the body, an eye located at one end of the shank and having a line-receiving mouth that is unobstructed upon the longitudinal movement of the shank in one direction, and a line-receiving eye carried by the other end of the shank and normally constituting a lock to prevent the longitudinal movement of the shank and the consequent opening of said mouth.

11. In a fishing-bob, the combination with a float-body, of a longitudinally-movable shank passing through the body and having one end laterally movable, a terminal hook carried by the laterally-movable end of the shank and having a mouth that is unobstructed upon the lateral movement of the shank in one direction, and a line-receiving hook located at the other end of the shank and having a mouth that is unobstructed upon the longitudinal movement of said shank, said laterally-movable hook constituting means for normally holding the shank against longitudinal movement.

12. In a fishing-bob, the combination with a float-body, of a tubular holder passing therethrough and projecting beyond the opposite ends of said body, a shank passing through the holder and in engagement with the interior walls thereof, said shank being capable of longitudinal movement in the holder and having one end movable laterally of said holder, a terminal hook carried by the laterally-movable end of the shank and having a free terminal normally engaging the adjacent end of the holder, said terminal being movable laterally away from the holder upon the corresponding movement of the shank to permit the passage of a line, a terminal hook carried by the other end of the shank and having a free terminal normally in engagement with the adjacent end of the holder, said terminal being movable away from the holder upon the longitudinal movement of the shank and in one direction to permit the passage of a line.

13. A fishing-bob including a float-body and a line-receiving eye having an axis disposed in angular relation to the longitudinal axis of the float-body, said eye being movable to either of two positions with respect to the body, in one of said positions said eye permitting the introduction or removal of a line, and in the other position being obstructed to retain the line therein.

14. A fishing-bob having a movable shank and a line-receiving hook, said hook being unobstructed and obstructed respectively upon the movement of the shank to predetermined positions to respectively permit the introduction or removal of a line and the retention of such line.

In testimony that I claim the foregoing as my own I have hereto affixed my signature in the presence of two witnesses.

ABRAM C. PERSING.

Witnesses:
    W. E. SHOOK,
    F. G. SIMMONS.